Patented Aug. 17, 1926.

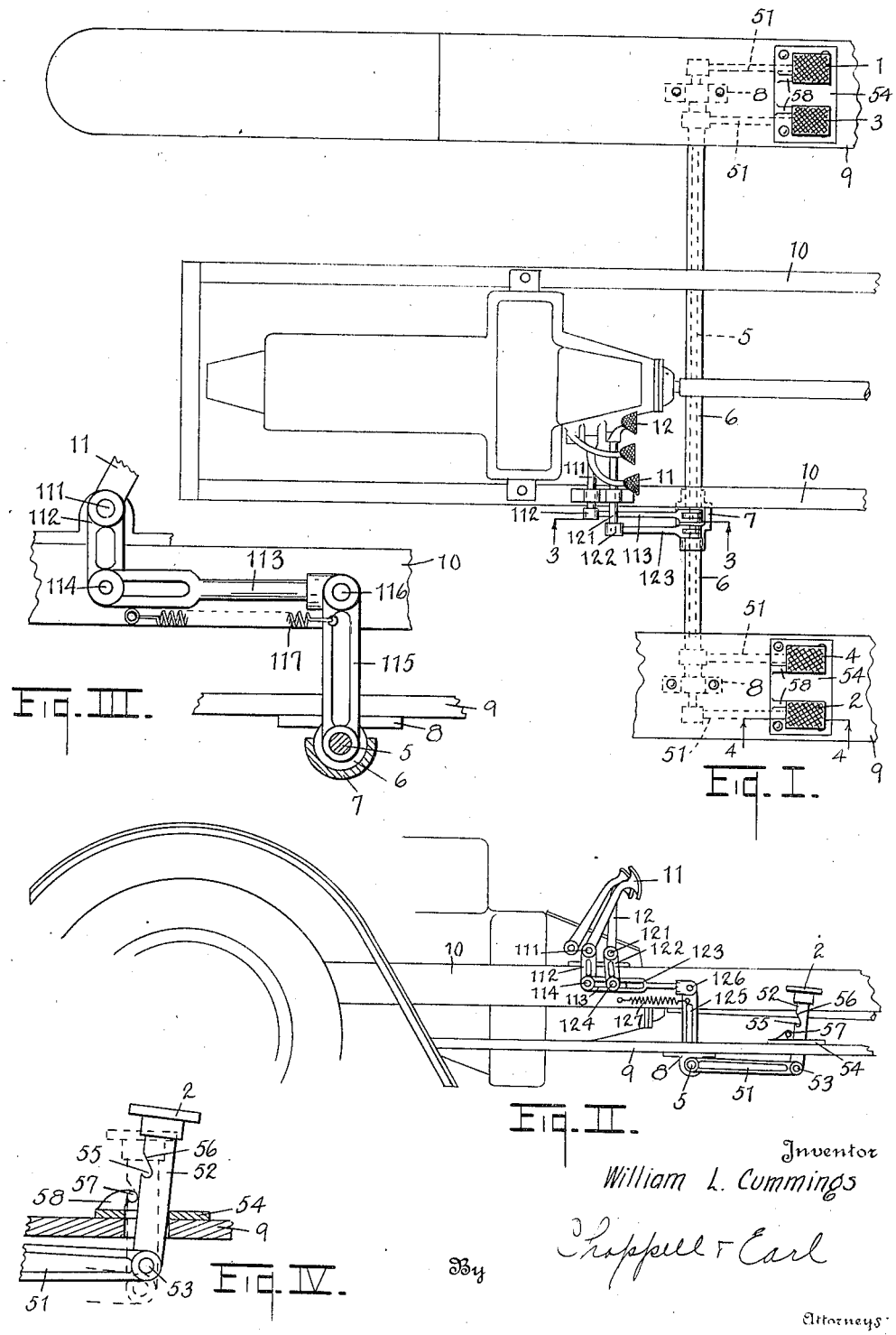

1,596,001

UNITED STATES PATENT OFFICE.

WILLIAM L. CUMMINGS, OF MUSKEGON, MICHIGAN.

FOOT PEDAL.

Application filed January 23, 1925. Serial No. 4,244.

This invention relates to an improved construction of foot pedals for controlling the clutch at low speed and the brake of motor trucks or the like, permitting side operation thereof.

The objects of the invention are:

First, to provide an improved truck body pedal arrangement to permit effective driving of a truck, such as a Ford, by a man standing on the running board on either side and an effective lock capable of independent control from either side.

Second, to provide such a pedal structure which may be used as an attachment to a regular construction of truck, such as a Ford truck.

Objects pertaining to details of construction and operation will appear from the detailed description to follow.

I accomplish the objects of the invention by the devices and means described in the following specification. The invention is defined and pointed out in the claims. A structure which is a preferred embodiment of the invention is illustrated in the accompanying drawing, forming a part of this specification, in which:

Fig. I is a plan view of a part of the chassis for a Ford one-ton truck, showing my improved pedal arrangement, the position and arrangement of certain parts appearing in dotted lines.

Fig. II is a side elevation of the same, showing the locks disengaged.

Fig. III is an enlarged detail side sectional view of the slotted lock connections on the brake pedal, taken on line 3—3 of Fig. I.

Fig. IV is an enlarged detail sectional view on line 4—4 of Fig. I, showing the automatic pedal lock and release means adapted to operate from either side of the vehicle.

In the drawing similar numerals of reference refer to similar parts throughout the several views, and the sectional views are taken looking in the direction of the little arrows at the ends of the section lines.

The parts of the drawing will be referred to by number. 1 and 2 are auxiliary brake pedals. 3 and 4 are precisely similar auxiliary low gear pedals disposed above the running board on opposite sides of the vehicle body. These pedals are connected by telescoped cross rock shafts. Rock shaft 5 is supported and carried by journal bearing boxes 8 hung on the under sides of the running board 9. The tubular rock shaft 6 telescopes over the rock shaft 5. It is in two sections coupled by the transversely slotted coupling 7 (see Figs. I and III).

The brake pedal 11 is pivotally supported by short rock shaft 111, substituted for its usual pivot. This is provided with arm 112 projecting down, to which is connected the horizontal slotted link 113, the slot of which embraces pin 114 at the lower end of said arm 112. Rock shaft arm 115, carried by rock shaft 5 and projecting up through the slot in coupling 7, is pivoted at 116 to link 113. This permits the brake to be operated by rock shaft 5, and also to be operated from the pedal 11 independently because of this lost motion connection.

Low gear pedal 12 is provided with a similar arrangement and connection to the tubular rock shaft 6. This comprises rock shaft 121 substituted for its pivot, downwardly projecting rock shaft arm 122, slotted link 123 with its slot embracing pin 124 at the lower end of arm 122, the rock shaft arm 125 secured to shaft 6 and projecting up and pivoted at 126 to the slotted link 123. This permits the low gear to be operated by the rock shaft 6 or independently by the pedal 12. Spring 117 throws rock shaft arm 115 yieldingly forward. Spring 127 is provided for arm 126.

Precisely similar rock shaft arm connections and locks are provided for each pedal at the opposite ends of the transverse rock shafts 5 and 6. The description of one will suffice.

Horizontal rock shaft arm 51 is connected by pivot 53 to the lower end of pedal shank 52. This shank projects through slotted guide plate 54 on the running board and inclines slightly to the rear when disengaged. The shank has an upwardly engaging notch 55 inclined on its upper side at 56 to cam the shank rearwardly. A pin 57 is on an upwardly projecting ear 58 on guide plate 54 to engage the notch to lock the pedal in each instance and also to cam the shank to throw it out of engagement.

A series of notches may be provided to adjust the levers to different positions. However, one when rightly located for the particular work is preferred, so I illustrate but one in each shank.

While I have shown the rock shaft carrying the pedals telescoped together, which is a matter of convenience in construction and assembling and economy of support as an attachment, such shafts might be separately supported. It is clear that the arms or levers at one side only of the auxiliary pedals need to be connected to the main pedals.

I desire to claim the specific form in which I have shown my attachment and also to claim the same broadly. I also desire to claim the structure broadly independent of its attachment feature.

Having thus described my invention, what I claim as new and desire to secure by Letters Patent is:

1. In an attachment for a truck for side control, the combination of transversely disposed telescoping rock shafts with bearing hangers for attachment to the running boards, auxiliary pedal levers secured to the opposite ends of each such rock shafts beneath said running boards, an auxiliary pedal disposed above said running board for each said arms with a downwardly depending shank pivoted at its lower end to its corresponding lever and provided with an upwardly engaging notch with a camming surface above the same, a slotted guide plate for each shank provided with a pin to engage said notch and react upon the camming surface whereby said shafts can be actuated or released from either side; rock shaft means connected to both the brake and low gear pedals, downwardly projecting lever arms from each, upwardly projecting arms on each transverse cross shaft, slotted link lost motion connections therefrom to said pedal arms, and springs to hold said parts yieldingly in initial position whereby the said control levers can be actuated and released from any lever and locked at either side, as specified.

2. In an attachment for a truck for side control, the combination of transversely disposed telescoping rock shafts with bearing hangers for attachment to the running boards, auxiliary pedal levers secured to the opposite ends of each such rock shafts beneath said running boards, an auxiliary pedal disposed above said running board for each said arms with a downwardly depending shank pivoted at its lower end to its corresponding lever and provided with an upwardly engaging notch with a camming surface above the same, a slotted guide plate for each shank provided with a pin to engage said notch and react upon the camming surface whereby said shafts can be actuated or released from either side, connections from said rock shafts to the brake pedal and low gear pedal respectively, and yielding means to hold them in initial position, as specified.

3. In an auxiliary side control for a truck, the combination of the frame, main control levers, transverse rock shafts beneath the chassis, bearings therefor secured to the running board, auxiliary pedal levers secured to said rock shafts, lever arms connected to the main pedals, arms on said rockshafts, and links with lost motion connections between the auxiliary pedals and said lever arms.

In witness whereof, I have hereunto set my hand.

WILLIAM L. CUMMINGS.